US005692861A

United States Patent [19]

Stottmann

[11] Patent Number: 5,692,861

[45] Date of Patent: Dec. 2, 1997

[54] METHOD AND DEVICE FOR MAKING DOVETAIL AND PIN PATTERN PLATES

[76] Inventor: Richard L. Stottmann, 5204 Avish La., Harrod's Creek, Ky. 40027

[21] Appl. No.: 710,173

[22] Filed: Sep. 12, 1996

[51] Int. Cl.[6] .................... B23C 9/00; B27C 5/00; B27F 1/14

[52] U.S. Cl. .................... 409/132; 33/562; 144/144.51; 144/144.1; 144/347; 144/372; 409/131; 409/130

[58] Field of Search .................... 33/562, 563, 564; 409/125, 130, 131, 132, 182; 144/85, 87, 78, 137, 136.95, 144.1, 144.51, 154.5, 347, 372; 29/530

[56] References Cited

U.S. PATENT DOCUMENTS

| | | | |
|---|---|---|---|
| 4,014,090 | 3/1977 | Rusk et al. | 29/530 |
| 4,074,736 | 2/1978 | Wolff | 33/562 |
| 4,168,730 | 9/1979 | Keller . | |
| 4,405,004 | 9/1983 | Dicke | 144/144.51 |
| 4,428,408 | 1/1984 | Grisley | 409/130 |
| 4,630,657 | 12/1986 | Obradovich . | |
| 4,648,433 | 3/1987 | Wolff | 409/130 |
| 4,809,755 | 3/1989 | Pontikas | 144/144.51 |
| 4,837,939 | 6/1989 | Pullen . | |
| 5,139,062 | 8/1992 | Keller . | |
| 5,143,132 | 9/1992 | Keller . | |
| 5,161,592 | 11/1992 | Rasmussen . | |
| 5,199,477 | 4/1993 | Keller . | |
| 5,285,580 | 2/1994 | Christensen . | |
| 5,285,832 | 2/1994 | Gibson | 144/144.51 |
| 5,345,986 | 9/1994 | Kieffer . | |

OTHER PUBLICATIONS

American Woodworker, Mar. 1988, Keller Dovetail Templates.

Keller Dovetail System brochure, 1991.

*Primary Examiner*—W. Donald Bray
*Attorney, Agent, or Firm*—Wheat, Camoriano, Smith & Beres, PLC

[57] ABSTRACT

A template for use in preparing additional templates to be used in the fabrication of dovetail joints comprises a single planar member having a pair of sides in which the member defines a first and second plurality of elongated openings of a particular shape. The first plurality of elongated openings have enlarged circular ends through which started holes are drilled into an underlying blank. A router is then inserted into the started hole and guided by the sides of the first elongated openings defines a pattern in the underlying form. Similarly, the second plurality of elongated openings provide a guide to a router for forming a pattern on the other side of the form. The form then becomes a template for use in the fabrication of both the dovetails and pins of a dovetail joint.

15 Claims, 6 Drawing Sheets

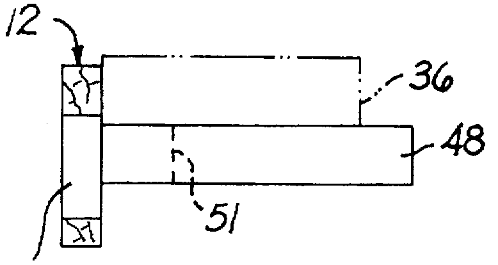
FIG. 5
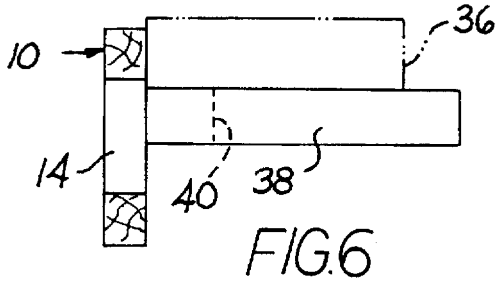
FIG. 6
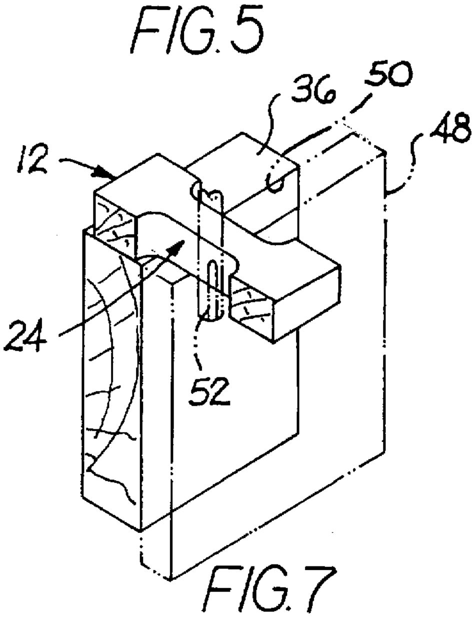
FIG. 7
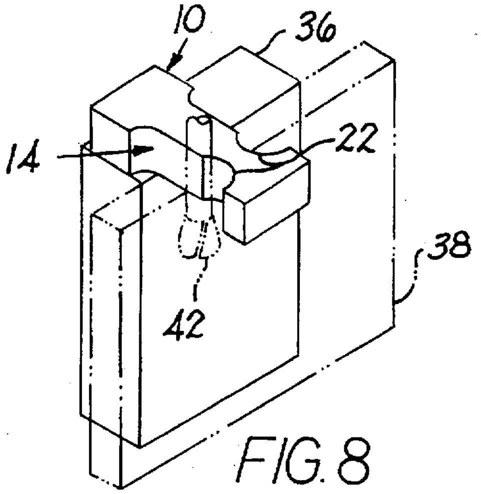
FIG. 8
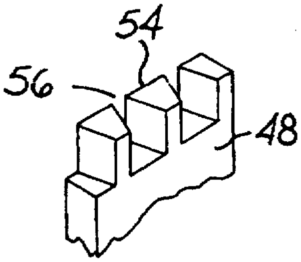
FIG. 9
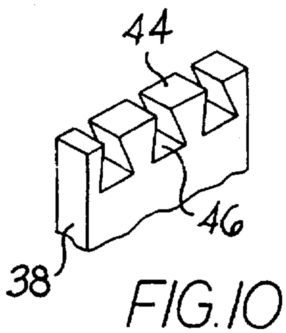
FIG. 10
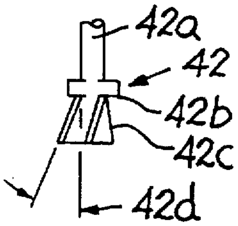
FIG. 8a
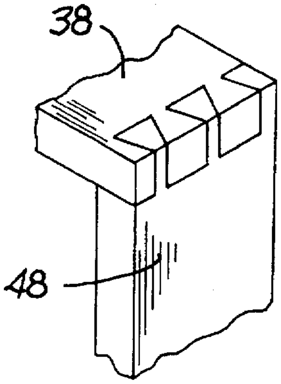
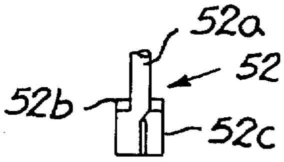
FIG. 7a
FIG. 11

METHOD AND DEVICE FOR MAKING DOVETAIL AND PIN PATTERN PLATES

BACKGROUND OF THE INVENTION

The present invention relates to a method and device for making pattern plates used in the fabrication of dovetail and pin joints resembling hand made joints.

The use of dovetail joints to fit parts of furniture together is an admirable and old woodworker art which is generally pleasing to the eye, particularly when the joints are created by hand with a nonuniform classic appearance. Dovetails made with perfectly fitting joints are considered to be the product of a highly skilled craftsman. Those steeped in knowledge of the art carefully review the quality of the joints and grade the craftsman's woodworking abilities.

A dovetail joint has two different parts or components called tails and pins which fit together in a complimentary fashion to form the attractive looking joint. The most popular dovetail joints are the "half-blind" and the "through" dovetail joints. The half-blind joint can only be seen on one side of the two joined surfaces and is primarily used for flushed and lipped drawers. The through joint can be seen on both surfaces. Whether half-blind or through dovetail joints are being crafted, it is almost axiomatic that the more tails and pins required for a particular woodworking project, the more time consuming the fabrication becomes. For those who made a living constructing furniture that typically incorporate dovetail joints, a compromise had to be struck between the number of "pins" seen in the joint or whether to use dovetail joints at all. When too few pins are used in joining a pair of wood members, the resulting joint may be structurally too weak. To reduce the amount of time required to produce dovetail joints, many craftsman resort to using various types of commercially available "jigs". A "jig", for purposes, of this description, may be defined as a device used to maintain mechanically the correct positional relationship between a piece of work and the tool. One example of a jig used to make dovetail joints is the "Kehoe Jig" of the available from the L.C. Kehoe Manufacturing Corp., Whitefish, Mont. Another multi-functional jig producing half-blind or through joints of variable spacing is available from Leigh Industries in Port Coquitlam, British, Columbia, Canada. Similarly, Porter-Cable produces a jig known as the "Omnijig" which is capable of producing various types of dovetail joints including through and half-blind joints. The jigs, while providing admirable dovetail joints, are complicated to set up and use and provide joints of limited length.

Perhaps the easiest-to-use jig for the making of through dovetail joints is called the Keller dovetail "template" system available from Keller & Co., of Petaluma Calif. which involves, in part, the use of a template. In the wood working art, the terms "jig" and "template" are used interchangeably. However, to promote clarity in this description, a "template" is distinguished from the aforementioned definition of jig by being defined as a gauge, pattern or mold, typically formed in a thin plate or board, used as a guide for a tool such as a router to replicate the pattern of the template in a piece of material secured or fixed to the template. Similarly, a "pattern plate", again for purposes of this description, is defined as a plate having a pattern serving as a guide for a router and the like to fabricate a configuration in a work piece. The Keller system, employs the use of machined pattern plates as a guide for a router bit to directly fabricate the mating parts of a dovetail joint, namely, the pins and dovetails. The Keller system, described in detail in several patents, including U.S.

Pat. Nos. 4,168,730; 5,139,062; and 5,199,477, is easy to use and can provide variable length dovetail joints. The Keller system, however, is cumbersome when used to make dovetail joints with variable spacing, often requiring the purchase of a different jig. Moreover, the individual cutters and pattern plates comprising the system are expensive and must be replaced when accidentally damaged by a router bit during use or bent by accidentally dropping the plates. The home craftsman has limited ability to repurchase such pattern plates.

It is therefore one object of the present invention to provide the average woodworker a method of making highly precisioned shop made pin and dovetail pattern plates for the production of dovetail joints of unlimited length and/or variable spacing.

It is still another object of the present invention to provide for a template to produce dovetail pattern plates easily and inexpensively replaced when damaged.

It is a further object of the present invention to provide for a simple template for the making of dovetail pattern plates without significant set up time, to be used in a dovetail jig that has no moving parts, and is unaffected by the cut limitations imposed by the router cut depth.

A still further object of the present invention is to provide for a method of fabrication of a template, allowing the home shop fabrication of pattern plates with multispacing openings from the same template, enabling the craftsman to fabricate joints, using the multispacing pattern plates, that appear hand-cut irrespective of the joint width.

These and other objects will be addressed and met by the foregoing description of the preferred embodiment.

SUMMARY OF THE INVENTION

A template constructed in accordance with the preferred embodiment of the present invention includes a single planar member having a pair of sides in which the member defines a first and second plurality of elongated openings. The first plurality of elongated openings are positioned adjacent one of the sides and extend between an oppositely disposed first and second circular ends. Each of the openings of the first plurality have opposing parallel sides spaced a distance apart substantially equal to a diameter of a bearing of a preselected cutter bit. The first circular ends have diameters substantially equal to this distance while the second circular ends having diameters larger than the distance.

The plurality of second openings are positioned adjacent the other side of the planar member sides. A portion of the second openings have spaced opposing sides that are parallel have spaced opposing sides that are parallel while another portion of the second openings have opposing sides that converge toward one another away from the first portion. The parallel spaced sides are separated by a distance greater than said diameter of said bearing of the preselected cutter bit. The convergence of the sides of the second openings defines an angle substantially equal to the angle of the preselected dovetail cutter bit.

A preferred method of making dovetail and pin pattern plates employs a template described above in the sequence of steps set forth in the following manner. The template described above is positioned over a rectangularly shaped form, comprised of an inexpensive but cuttable material, so that one edge of the template is aligned with an edge of the form. A starter bit is passed through the enlarged diameter holes of selected openings of the plurality of first openings and through selected openings of the second portion of the plurality of second openings and starter holes are drilled in the underlying form. A pattern cutter bit with a rotatable guide bearing of a diameter less than the diameter of the starter holes is inserted through the openings so that the cutter bit extends into the starter holes and the rotatable bearing is rotatably engaged with the side of the openings. A plurality of pin openings and a plurality of dovetail openings are then cut in the form. The form, now being a unitary pattern plate, for the preparation of dovetails and pins, is removed from the template and is ready for use. If desired, the unitary pattern plate can be cut and separated along a line intermediate the pluralities of pin and dovetail openings into separate pin and dovetail pattern plates.

BRIEF DESCRIPTION OF THE DRAWING

FIG. 5 is a sectional view taken along lines 5—5 of FIG. 3;

FIG. 6 is a sectional view taken along lines 6—6 of FIG. 4;

FIG. 7 is a perspective view illustrating the cutting of pin portion of a dovetail joint using the pattern plate of FIG. 2;

FIG. 7*a* is a side view of the bit used in the cutting of the pin portion;

FIG. 8 is a perspective view illustrating the cutting of the dovetail portion of a dovetail joint using the pattern plate of FIG. 1;

FIG. 8*a* is a side view of the dovetail bit used in the cutting of the dovetail portion;

FIG. 9 is a perspective view of a pin board of a dovetail joint;

FIG. 10 is a perspective view of a dovetail board of a dovetail joint;

FIG. 11 is a perspective view of a dovetail joint made with the boards illustrated in FIGS. 9 and 10;

DETAILED DESCRIPTION OF THE PREFERRED EMBODIMENT

The art of preparing dovetail joints is replete with language and specific definitions. To ensure clarity, it is important to define some of this language to provide support for this description. Thus, a "dovetail joint", is a joint in which two ends of members, typically made of wood, are meshed together in a complimentary joint. In the machining of "through" dovetail joints, wood is carefully and precisely removed from an end of each wooden member to form "dovetails or tails" and "pins" extending across the entire thickness of each member. The spacing where the wood is removed between the tails and pins are "sockets" into which the pins and tails fit snugly in a well made dovetail joint. To machine the sockets, the craftsman selects a dovetail bit of a particular diameter, slope angle, adjustable cutting height, and shank size. The diameter of the bit determines the maximum width of the socket, the cutting height determines the socket depth, and the slope angle determines that slope angle of the dovetail joint. Typical bits come in diameters between about 1/8" to 1 1/4" and angles vary from less than 5° to 14° or more although typical angles used are between about 5° to 10°. As stated above, many craftsman prefer using jigs and associated pattern plates when constructing dovetail joints as a great time saver. When a pattern plate is employed, the shanks of the bits used to cut the wood come equipped with a rotatable bearing that engages the sides of the pattern plate to guide the cutting action of the bit blade. Alternatively, guide bushings may be used.

The present invention does not pertain to the technique of making dovetail joints, but is drawn to a preferred template for and a preferred method of using such template in the making of the actual pattern plates used in the fabrication of the joints. However, to promote a clearer understanding of the present invention, it is appropriate to initially discuss the actual use of such pattern plates through the use of FIGS. 1–12 for a better understanding of the present invention. For a more detailed discussion of the use of pattern plates for making dovetail joints, reference can be made to a number of readily available and known publications on the subject, including U.S. Pat. Nos. 4,168,730; 5,139,062; and 5,199,477 mentioned above.

Figure 1:
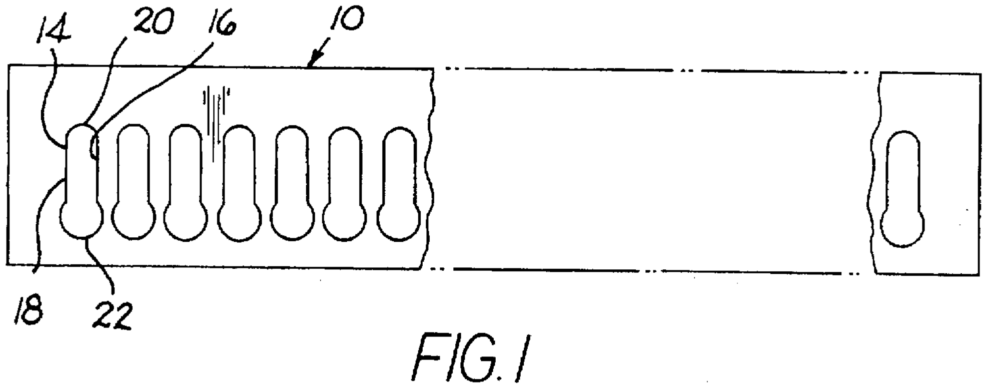
FIG. 1 is a top plan view of a separated dovetail pattern plate made in accordance with the present invention.
Figure 2:
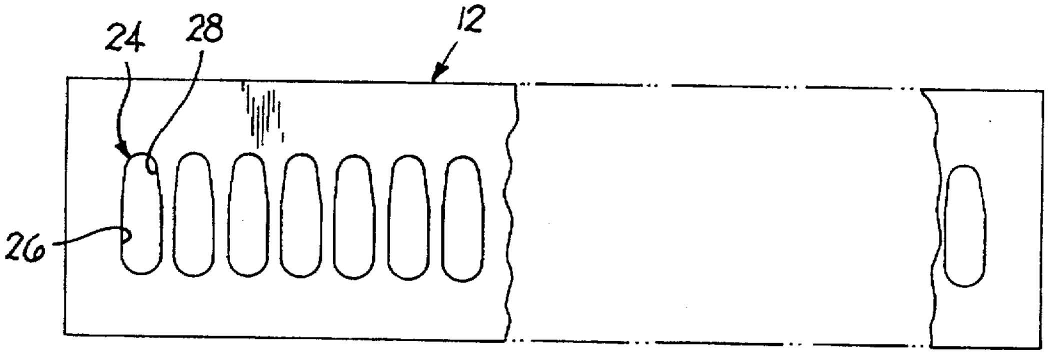
FIG. 2 is a top plan view of a pin pattern made in accordance with the present invention.

Preparation of a dovetail joint with pattern plates made with the templates of the present invention FIGS. 1 and 2 depict, respectively, a separated "tail" pattern plate 10 and a separated "in" pattern plate 12 made using the template of the present invention as will be described below. Tail pattern plate 10 defines a multiplicity of elongated tail openings 14 that extend along the width of the pattern plate. Each opening 14 has parallel spaced sides 16 and 18 extending between circularly shaped ends 20 and 22. The diameter of the circle of which end 20 is a part is equal to the distance between sides 16 and 18 while circular end 22 has a diameter greater than the diameter of a dovetail bit associated with this pattern plate 10.

Figure 12:
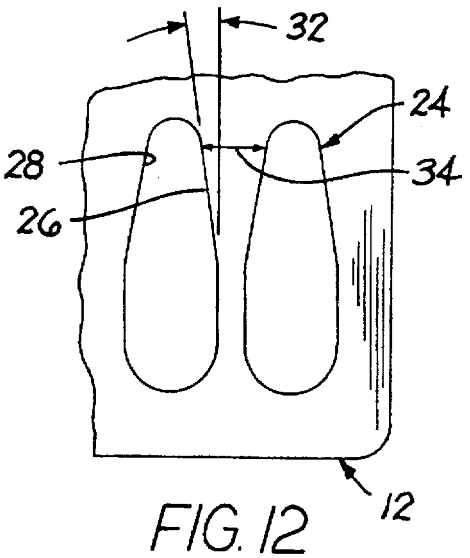
FIG. 12 is an expanded top view of two adjacent openings taken from FIG. 2.

The separated pin pattern plate 12 in FIG. 2 defines a second group of elongated openings 24 called pin openings that extend along the width of the pattern plate 12. As best illustrated in the expanded view of FIG. 12 depicting a pair of adjacent pin openings 24, each of the pin openings 24 has a portion 26 in which the spaced opposing sides 28 and 30 are substantially parallel and a portion 27 in which the sides 28 and 30 are converging toward each other. The angle of convergence 32 of the sides may be defined as the angle formed between the converging sides and parallel sides as shown by the dashed extensions of those sides in FIG. 12. As will become clearer below, angle 32 must be equal to the dovetail bit angle used in forming the pin sockets between the dovetails. Moreover, the distance 34, the maximum width of pin formed when the wood material beneath adjacent pin openings 24 is removed, should be substantially equal to the diameter of the dovetail bit used.

Figure 3:
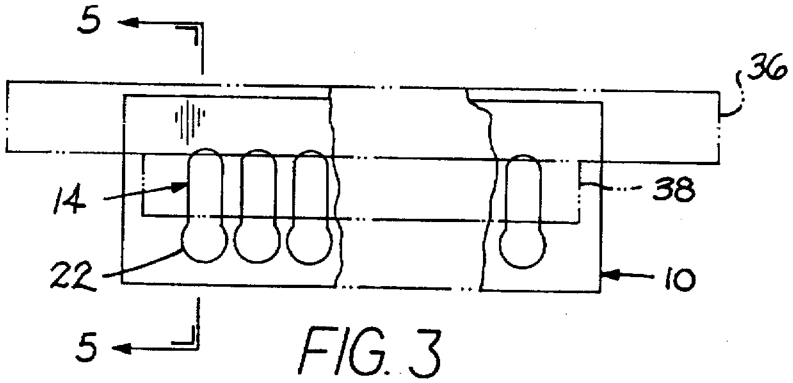
FIG. 3 is top view of the pattern plate of FIG. 1 mounted for use.

To make a dovetail joint, the pin sockets are cut first. To illustrate the sequence of cutting, reference is made to FIG. 3, 6, 8 and 10 for the cutting of the pin sockets and FIGS. 4, 5 7, and 9 for the cutting of the dovetail sockets. To prepare the pin sockets, a board 38, as illustrated in FIGS. 3, 6 and 8, is first clamped to a backing member 36 into which the pin sockets are to be cut and called the "tail" board. It should be recalled that the pin sockets are the openings into which the pins will fits. In the view of FIG. 3, only the end of the board 38 can be seen. The surface of the board 38 that will be visible when in place, the "appearance" surface, is positioned facing the backing member 36. Next, the tail pattern plate 10 is clamped to or otherwise fixed to clamped backing member 36 and tail board 38 so that the circular ends 22 of openings 14 are is not over the tail board 38. The parallel sides 16 and 18 of openings 14 should extend beyond the thickness 39 of the tail board 38 on both sides. The thickness of the board to be used as the pin board is etched on the tail board 38 as shown by dashed line 40 (as illustrated in FIG. 6).

Next, an appropriate dovetail bit 42 is selected. A typical dovetail bit has a shank **42*a* for clamping to a router, a bearing guide member 42*b*, and a flared blade 42*c* as seen in FIG. 8*a*. The flare or slope angle 42*d* of blade 42*c* determines the angles of the resulting dovetail joint. Thus, it is essential that the dovetail slope angle 42*d* be substantially equal to the divergence angle 32 defined above. The shank 42*a* is secured in the collet of a router (not shown) and then inserted through circulars end 22 and adjusted to cut to the line 40 as illustrated in FIG. 8. Using well known techniques and safety precautions, the craftsman then starts the router and uses the dovetail bit to cut away the wood in the tail board with the rotatable bearing 42*b* following the guide provided by sides of the openings 14 in the pin pattern plate 10. The end results of the cutting are the dovetails 44 and pin sockets 46 depicted in FIG. 10 illustrating a portion of the finished end of the tail board 38**.

Figure 4:
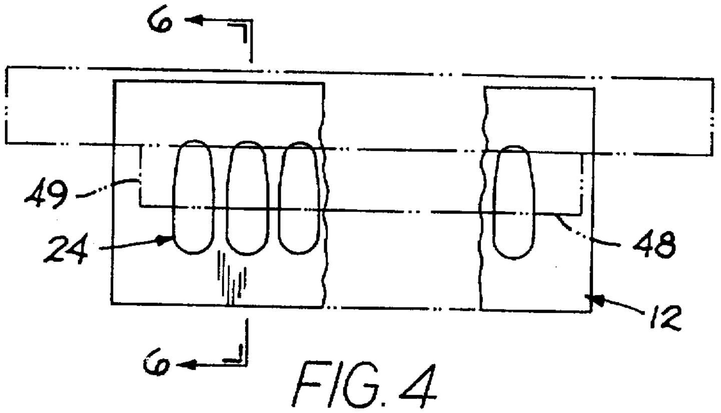
FIG. 4 is a top view of the pattern plate of FIG. 2 mounted for use.

The finished tail board 38 is then used to assist in the fabrication of the pin board 48 as illustrated in FIGS. 4, 5, and 7. The end of the tail board 38 is aligned with the end of board 48 and the side profiles of, preferably two or more, dovetails 44 are traced with a sharp edge on the end of the pin board 38 as shown by the single profile line 50 in FIG. 7. Backing member 36 is clamped by any well known clamping device to pin board 48 so that the appearance surface of board 48 faces member 36. Then the openings 24 in pin pattern plate are aligned with the traced profile lines 50 on the pin board so that the diverging sides 26 and 28 overlap the width of the pin board 48. The thickness of the tail board 38 is then pencilled on the pin board 48 as shown by line 51 in FIG. 5. A pin bit 52 such as shown in FIG. **7*a* is then selected. Such pin bits have a shank 52*a* adapted to be secured in the collet of a router (not shown), a bearing guide member 52*b*, and a straight cutting blade 52*c*. The length of pin bit 52 is then adjusted to line 51 followed by energizing the router and cutting away of the wood in pin board 48 using the converging sides of openings 24 as guides for the rotatable bearing 52*b*. The end results of the cutting are pins 54 and dovetail sockets 56 as illustrated in FIG. 9**.

As illustrated by the arrows leading from FIGS. 9 and 10 to FIG. 11, the configured ends of boards 38 and 48 are joined together to FIG. 11 illustrates a complete dovetail joint. FIG. 11 further illustrates the importance of ensuring that the angle of convergence is equal to the slope angle of the dovetail bit.

Template for fabricating dovetail pattern plates

Figure 13:
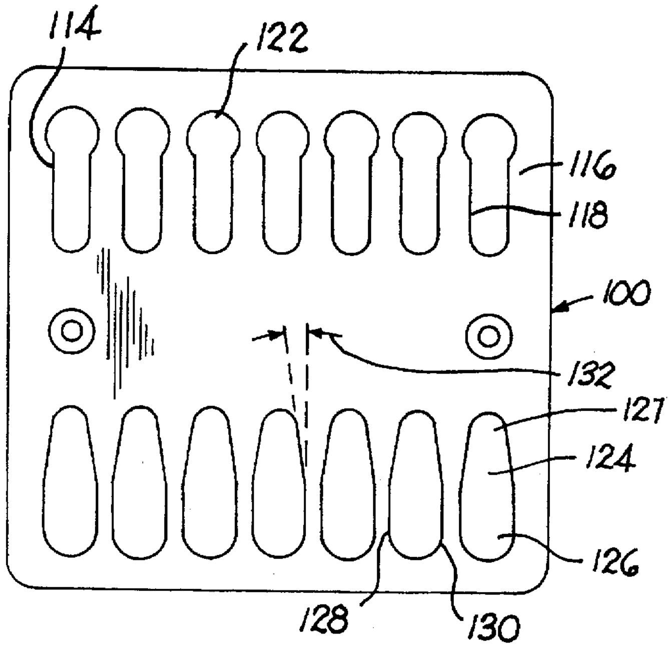
FIG. 13 is a top plan view of a template for making dovetail and pin templates in accordance with the present invention.
Figure 14:
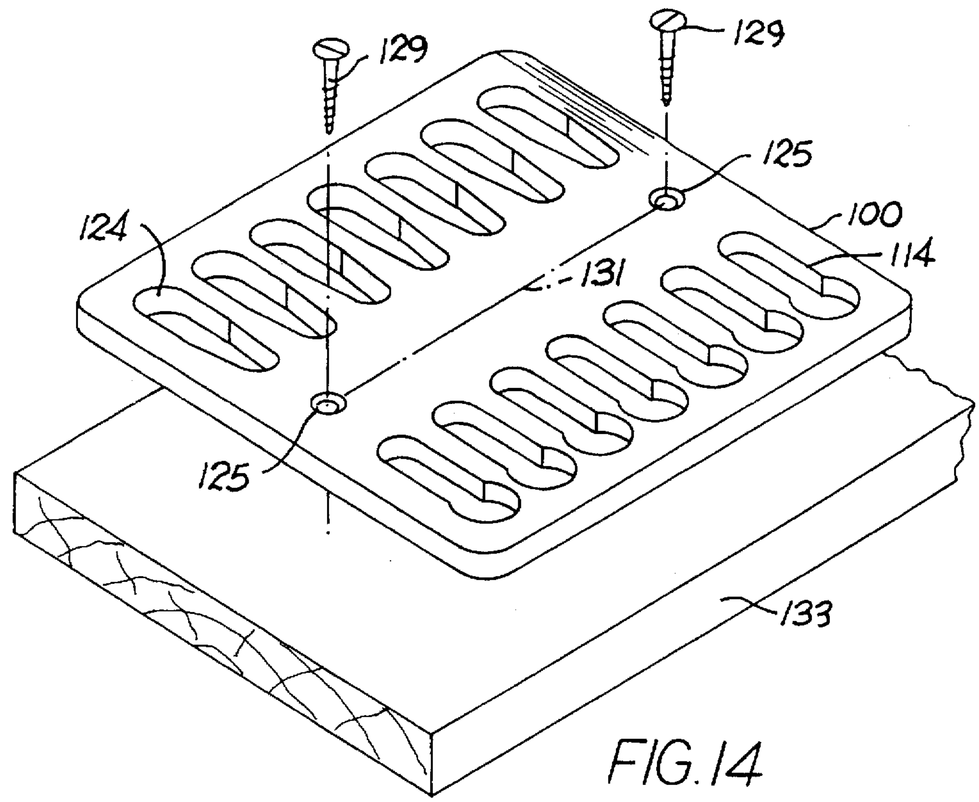
FIG. 14 is a perspective view of the template of FIG. 13 being mounted to cuttable material (a "form") in preparation of the fabrication of a pin and dovetail pattern plate.

Reference is now made to FIGS. 13 and 14 depicting a template 100 that may be employed to make the pattern plates 10 and 12 described above in a quick and economical manner. Because the template 100 resembles the pattern plates 10 and 12 in certain aspects, like character numerals in the 100's, where possible, will be used to identify such similar features on template 100. Template 100, itself, is a unitary member, planarly shaped and preferably injection molded from a durable thermoplastic material, e.g., polypropylene, although other and more expensive materials could also be used. The template could also be machined from aluminum and other similar materials. A first plurality of elongated spaced openings 114 align one side of template 100 and a second plurality of elongated openings 124 align an opposite side. A pair of counter bored openings 125 adapted to receive flat headed wood screws 129 are positioned essentially in the same plane as openings 124 as, for example, along a center line 131 of template 100 bisecting the region defining openings 124 from the region defining openings 114. As illustrated in the perspective drawing of FIG. 14, the template 100 is designed to be mounted and fixed by screws 129 to a form of cuttable material such as, for example, wooden board 133 from which the dovetail pattern plates are to be made. Other materials like plywood or plastic suitable for cutting may also be used.

Since by definition template 100 provides for replication of the openings, openings 114 and 124 have the same respective geometries that the openings 14 and 24 have in pattern plates 10. That is, openings 114 have parallel opposing sides 116 and 118 and an enlarged circular end 122. Similarly, openings 124 each have a portion 126 in which the spaced opposing sides 128 and 130 are substantially parallel and a portion 127 in which the sides 128 and 130 are converging toward each other. The angle of convergence 132 of the sides is defined, as described above, as the angle formed between the converging sides and parallel sides. Thus, each template 100 would be used to fabricate dovetail and pin pattern plates designed to be used with a dovetail bit 42 having a specified slope angle.

Method of fabricating dovetail and pin pattern plates

The following description is directed toward a preferred method of using a template described above in the making of dovetail pattern plates requiring a ½" diameter dovetail bit with a slope angle of 8° and 13/16" cutter length. Dovetail bits with other slope angles could be used with a template having the corresponding angle of divergence for the plurality of second openings. The template 100 itself for purpose of this specific description, has openings 114 and 124 that are respectively spaced one inch from center to center from each other.

Figure 15:
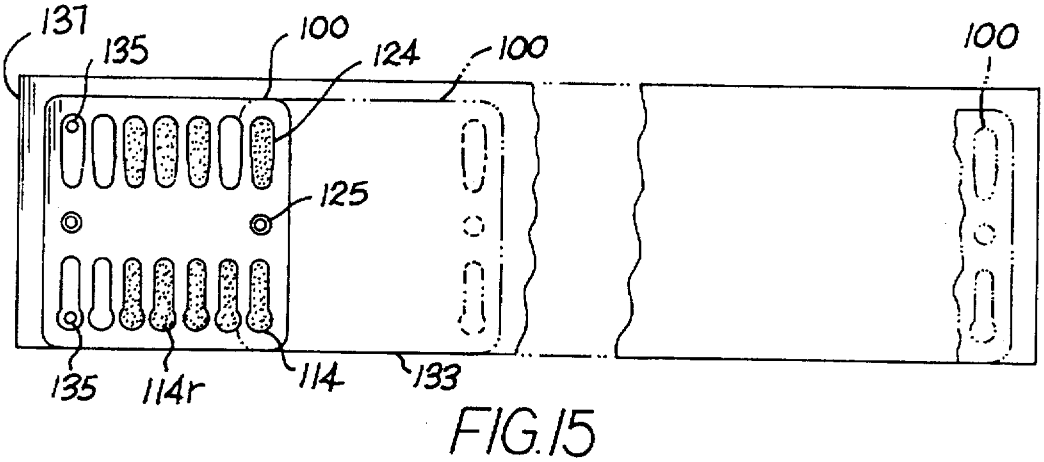
FIG. 15 is a top plan view of the template of FIG. 14 being used to form pattern plates of an indefinite length.

Referring now to FIG. 15, template 100 is aligned flush with the bottom edge 135 of pattern plate form board 133 about two inches from the end 137 and secured by fasteners 129. This step of aligning template 100 should not be construed as limiting since it is only for convenience of the craftsman. Other alignment techniques can be employed as well.

Figure 16:
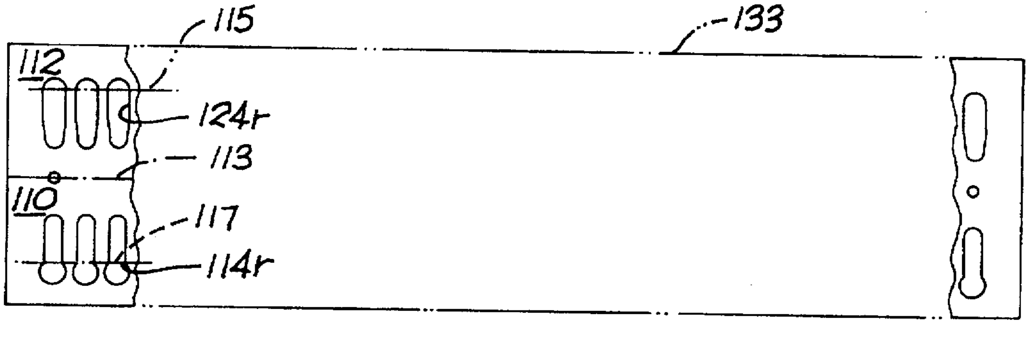
FIG. 16 is a top plan view of a unitary pattern plate of indefinite length.

The thickness of the board 133 is preferably between about ⅛" to 1" although the constraints with respect to material thickness is largely dependent only on the router bit constraints. In the widest part of each opening 114 and 124, a ⅝" starter hole 135 is drilled through board 133. This means that the bit is inserted through the enlarged opening 122 in openings 114 and in the portions 127 of openings 124. Upon completion of the drilling of the starter holes in the two groups of openings, a ½ inch pattern bit is inserted into the starter holes. Using the sides of the openings 114 and 124 as guides, the craftsman removes the material in board 133 and replicates the openings 114 and 124 in the underlying board 133. The shaded openings **114*r* and 124*r* in FIG. 16 represent the replicated openings in board 133 with the "r" denoting that the opening is replicated from a template. The cutting into the board to form the openings 114*r* and 124*r* may be accomplished in a single pass of the router in certain situations. Often it is desirable to make more than one pass, partially cutting into the underlying board 133 on the first and subsequent passes until the openings in board 133** are completely formed. Power ratings of the router, thickness of the template, types of materials comprising the board, and length of the router bit are all factors to be considered, among others, when determining whether or not multiple cutting passes are needed.

Assuming pattern plates capable of producing wide dovetail joints are desired, template 100 may be indexed to the right as shown by the phantom lines in FIG. 15. The left-most openings 14 and 124 are indexed to the right. As illustrated, openings 14 and 124 are registered with the right-most replicated openings in board 133 with the bottom edge of the template 100 held flush with edge 137. The template 100 is then again secured to the board 133 and the same procedure is again followed until the end of pattern plate form board 133 is reached. Depending on the width of the dovetail joint desired, the indexing to the right may be one, two or more of the replicated openings. The pattern plates so produced are now capable of forming ½" pins spaced 1" on center and have desired widths that are a multiple or a fraction of a multiple of the width of template 100.

While the technique illustrated for indexing the template 100 in FIG. 15 is preferred because of the ease that the craftsman can locate the template above the form, it should be understood that indexing could be accomplished by using other reference points provided on the template 100. For example, the template 100 could be provided reference markings used with the openings 125 to properly locate the template 100.

The resulting pin pattern plate 110 and tail pattern plate 112 are shown in FIG. 16 in unseparated form. Although the pattern plates may be used to form dovetail joints as an unitary body, first using one side and then the other, the two pattern plates may easily be separated by cutting along the center line 113, thus forming pin and dovetail pattern plates identical to those shown in FIGS. 1 and 2 with any desired length, readily usable by the craftsman in the home shop to produce quality dovetail joints. Because the pattern plates 110 and 112 are easy to reproduce, the craftsman avoids the too frequent necessity of purchasing costly replacement pattern plates due to accidental router damage to the dovetail and pin pattern plates.

Figure 19A:
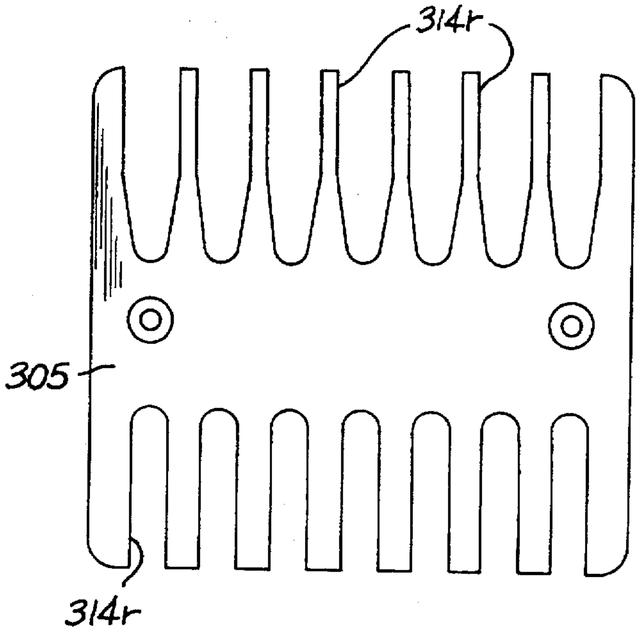
FIG. 19*a* is a top plan view of a dovetail and pin pattern plates that may be fabricated using the template of FIG. 19.
Figure 19:
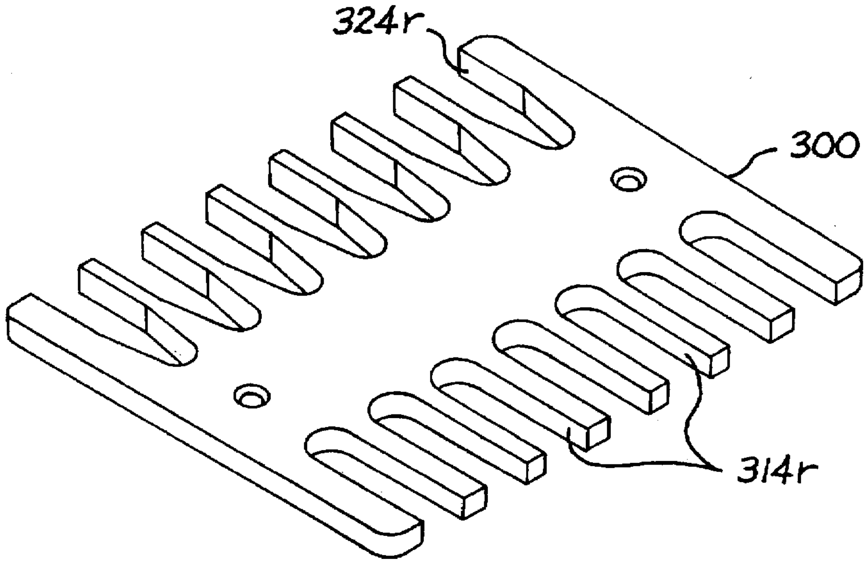
FIG. 19 is a perspective view of a template in accordance with the present invention having opened ended dovetail and pin openings.

It is preferred and recommended to maintain all replicated openings of the pin and tail pattern plates closed as opposed to having open ends. The web of material surrounding and closing the ends provides for significantly increased integrity and stability during cutting and indexing. Some craftsman, however, may desire for the openings in the pattern plates to have open ends so that the router does not have to be lifted out of the openings when moving to adjacent openings. To provide for the open ends, a cut may be made along either or both of lines 115 and 117 (illustrated in FIG. 16) intersecting the widest parts of the openings **114*r* and 124*r*. One way to accomplish this is using a template 300 such as that shown in FIG. 19 that itself has openings 314 and 324 with open ends. Another way to form a pattern plate with open ends is to make a cut as shown in FIG. 16 intersecting the widest parts of the openings 114*r* and 124*r*. A pattern plate 305 made by either techniques is illustrated in FIG. 19*a* wherein openings 314*r* align one side and openings 324*r*** align the other side of the plate.

Figure 17:
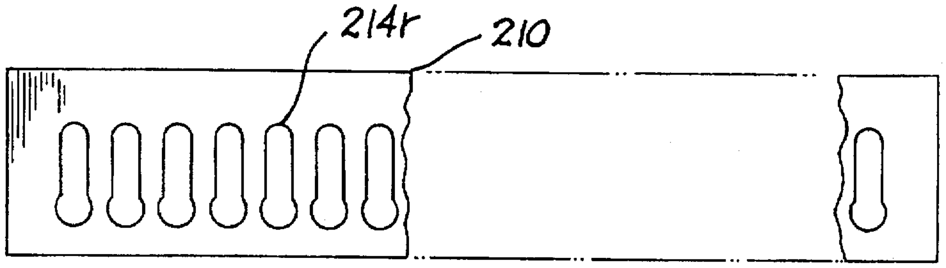
FIG. 17 is a top plan view of a separated dovetail pattern plate made using the present invention with increased spacing between openings.
Figure 18:
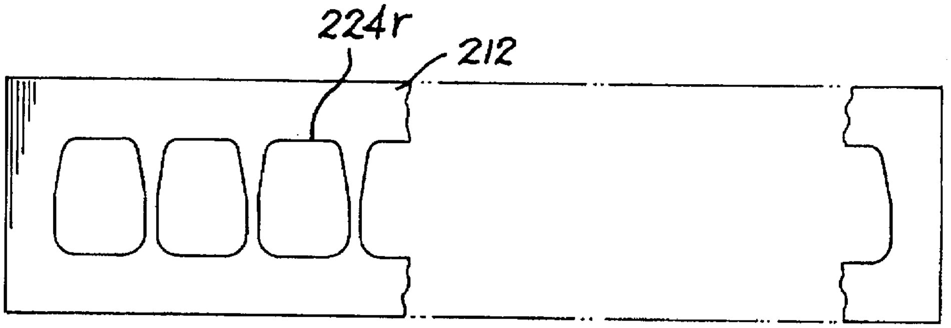
FIG. 18 is a top plan view of a separated pin pattern plate made using the present invention with material removed to provide for openings corresponding to the openings in FIG. 17.

One of the significant advantages of the present invention is that pattern plates can easily be made for creating wider dovetail spacings or mixed spacing. Wider dovetail spacing is particularly desirable for long dovetail joints where small spacing dovetail joints may be aesthetically "too busy looking". To double the spacing, the starter holes are made through every other one of the openings 114 and every one of the openings 124 in the underlying pattern plate board form 133. The cutting and removing of the material is identical to that discussed above, resulting in a pin pattern plate 210 as illustrated in FIG. 17. The tail pattern plate, however, is identical in all respects to the tail pattern plate 112 shown in FIG. 16 except that it has one-half the number of openings. To provide for the wider spacing in the tail pattern plate, the material between adjacent openings 124 is removed resulting in the openings **224*r* shown in FIG. 18. The pattern plates of FIGS. 17 and 18** are ready to be used to produce dovetail joints with ½" wide pins spaced 2" on center.

Figure 20:
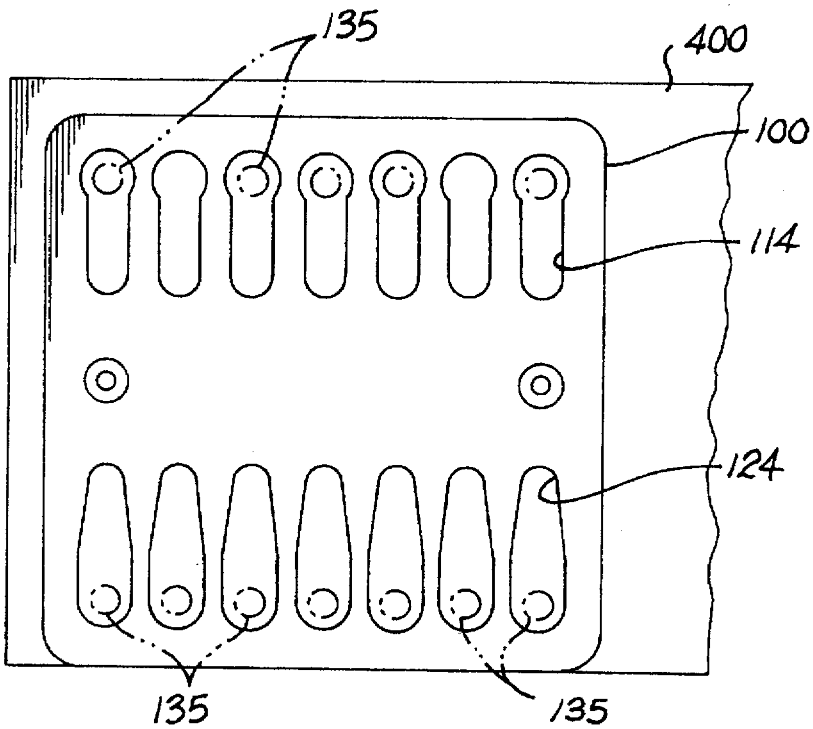
FIG. 20 is a top plan view of a template in accordance with the present invention overlaying a form into which starter holes have been drilled into the form through selected openings of the template as part of method to provide a pattern plate capable of making a dovetail joint with mixed spacing.
Figure 21:
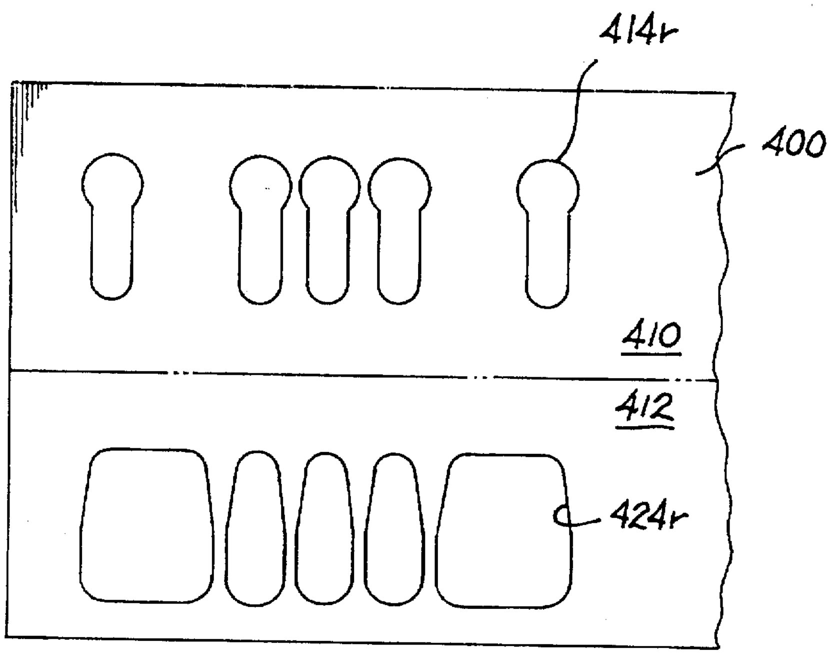
FIG. 21 is a top plan view of a unitary pin and dovetail pattern plate for making a dovetail joint having mixed spacing.

Finally, the template and method of the present invention may used to a make pin and tail pattern plates capable of producing a dovetail joint in which the spacing is not uniform. By selecting certain ones of holes 114 through which to drill starter holes and, as before, drilling starter holes through each of the openings 124, cutting the material away in the form using the appropriate sides of selected openings 114 and holes 124 to provide replicated **414*r* and 424*r* openings in the form 400 (see FIG. 21), and removing the webbing material between the associated openings 424*r*, the pattern plate shown in FIG. 21 can be produced. By way of example only, the first, third, fourth, fifth and seventh openings 114 were selected as illustrated by the starter holes in dashed lines in FIG. 20. This results in the replicated openings 414*r* in FIG. 21. The webbing cut between the associate openings 424*r*** is located between the first and second openings on one end and the sixth and seventh openings on the other end as illustrated by the shading. Other combinations can be selected as desired.

From the above, it can be seen that various size dovetail and pin pattern plates can be fabricated using the template above. Moreover, the thickness of the underlying board can be varied as desired, limited only by the length of the shank of the dovetail and straight bits selected. The dovetail and pin pattern plates can be fabricated from inexpensive materials which addresses the present burdensome problem of replacing expensive machined pattern plates damaged by routers. Moreover, the present invention now permits the construction of custom sized and highly precision pattern plates by the home craftsman. Other advantages and variations will be recognized by those with ordinary skill in this art upon a reading of this disclosure. Such modifications and variations should be interpreted in accordance with the spirit and scope of the appended claims.

I claim:

1. A method of forming dovetail pattern plates in a form using a template having a plurality of first spaced elongated openings and a second plurality of elongated openings each having a first portion with spaced parallel sides intersecting with a second portion in which the sides converge toward one another in a direction away from the first portion comprising the steps of positioning the template over the form made from cuttable material, passing a starter bit through selected openings of the first plurality of openings and through selected openings of the second portion of the second plurality of openings and drilling starter holes in the underlying form, placing a pattern cutter bit with a rotatable guide bearing of a diameter less than the starter holes through the openings so that the cutter bit extends into the starter holes and the rotatable bearing is rotably engaged with the sides of the openings and guiding said bearing along the sides thereby removing material from said form and forming a plurality of pin openings and a plurality of dovetail openings in said form, and removing the form from the template thereby forming a unitary pin and dovetail pattern plate from the form.

2. The method of claim 1 in which said first elongated openings have enlarged diameter first ends and said starter bit is passed through said enlarged diameter first ends of said first elongated openings to drill starter holes in the underlying form.

3. The method of claim 2 including the step of cutting the form along line intermediate the pluralities of pin opening and dovetail openings thereby forming separate pin and dovetail pattern plates.

4. The method of claim 2 including the step of cutting the form along at least one line opening the ends of at least one of the pluralities of pin and tail openings.

5. The method of claim 4 including the step of cutting the form along a line intermediate the plurality of pin and tail openings thereby forming separate dovetail and pin openings.

6. The method of claim 2 in which the step of placing and cutting is followed by a step of indexing the template to a new position along the form in which a projection of the openings of the template on the form provide a continuous pattern with the pin and dovetail openings in the form and repeating the steps of passing, placing and cutting thereby increasing the length of the plurality of pin openings and dovetail openings.

7. The method of claim 6 in which the step of indexing includes locating the first and second plurality of openings so that a left-most opening of each of said first and second pluralities is respectively aligned with a right-most opening of each of the plurality of pin openings and dovetail openings in the form.

8. The method of claim 2 including the step of initialing selecting a template matching the diameter of a selected dovetail bit in which the distance between facing sides of the first portion of adjacent elongated openings at a maximum convergence is substantially equal to the diameter of the selected dovetail bit.

9. The method of claim 2 in which dovetail and pin pattern plates of a uniform spacing are formed by passing the starter bit through each of the first and second pluralities of openings and drilling starter holes in the underlying form.

10. The method of claim 2 in which the bearing is guided against the sides of the openings a plurality of times to remove a portion of the material in said form each time until the openings are completely formed.

11. The method of claim 2 in which dovetail and pin pattern plates of wider spacing are formed by passing the starter bit through each of the second plurality of openings and every other of the first plurality of openings and drilling starter holes in the underlying form thereby forming dovetail and pin pattern plates of wider spacing.

12. The method of claim 11 in which the bearing is guided against the sides of the openings a plurality of times to remove a portion of the material in said form each time until the openings are completely formed.

13. A template for making pattern plates for preparing dovetail joints comprising a single planar member having a pair of sides, a plurality of first elongated openings adjacent one of said pair of sides and extending between an oppositely disposed first and second circular ends, said first elongated openings having opposing parallel sides spaced a distance apart substantially equal to a diameter of a bearing of a preselected cutter bit, said first circular ends having diameters substantially equal to said distance and said second circular ends having diameters larger than said distance, and a plurality of second openings adjacent a second of said pair of said planar member sides, one portion of said second openings having spaced opposing sides that are parallel and another portion having opposing sides that converge toward one in a direction away from said first portion, said parallel spaced sides being separated by a distance greater than said diameter of said bearing of said preselected cutter bit.

14. The template of claim 11 in which said converging second openings form an angle with a plane passing perpendicular to said planar member equal to an angle formed by a dovetail cutter.

15. A kit for the creation of dovetail and pin pattern plates comprising a starter bit of a predetermined diameter, a cutter bit having a cutter shape and a rotatable bearing in a shank of said bit, said cutter shape and rotatable bearing each having a diameter less than said predetermined diameter of said starter bit, a template for creating a dovetail pattern plate from a form of cuttable material, said template being adapted to be secured to a surface of the form and further including a planar member having a pair of sides, a plurality of first elongated openings adjacent one of said pair of sides and extending between an oppositely disposed first and second circular ends, said first elongated openings having opposing parallel sides spaced a distance apart substantially equal to said diameter of said bearing, said first circular ends having diameters substantially equal to said distance and said second circular ends having diameters larger than said predetermined diameter of said starter bit, and a plurality of second openings adjacent a second of said pair of said planar member sides, one portion of said second openings having spaced opposing sides that are parallel and another portion having spaced opposing sides that converge in a direction away from said first portion, said parallel spaced sides being separated by a distance equal to or greater than said diameter of said bearing, said starter bit being inserted through said first circular openings of said first openings and through the extensions of said selected second openings in said second region into said form to create starter holes in said form, said cutter bit being inserted through each of said first circular openings of said first openings and through each of said selected second openings into respective starter holes and said bearing rotably engaging and following said sides of said first and selected second openings to guide said cutter bit therealong in said form to create a dovetail pattern plate in said form.

* * * * *